US010720979B1

(12) United States Patent  
Paulotto et al.

(10) Patent No.: US 10,720,979 B1  
(45) Date of Patent: Jul. 21, 2020

(54) WIRELESS DEVICES HAVING SPIRALLY-DISTRIBUTED BEAM POINTING ANGLES

(71) Applicant: Apple Inc., Cupertino, CA (US)

(72) Inventors: Simone Paulotto, Redwood City, CA (US); Jennifer M. Edwards, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/510,556

(22) Filed: Jul. 12, 2019

(51) Int. Cl.
*H04B 7/06* (2006.01)

(52) U.S. Cl.
CPC ......... *H04B 7/0682* (2013.01); *H04B 7/0617* (2013.01)

(58) Field of Classification Search
CPC ..... H04B 10/61; H04B 7/0682; H04B 7/0617
See application file for complete search history.

(56) References Cited

U.S. PATENT DOCUMENTS

| | | | |
|---|---|---|---|
| 8,159,394 B2 | 4/2012 | Hayes et al. | |
| 10,096,891 B2 | 10/2018 | Choudhury et al. | |
| 10,141,993 B2 | 11/2018 | Lee et al. | |
| 10,327,155 B2 | 6/2019 | Zhao et al. | |
| 10,340,993 B2 | 7/2019 | Järmyr et al. | |
| 10,374,675 B1* | 8/2019 | Marr | H01Q 3/36 |
| 2003/0043071 A1* | 3/2003 | Lilly | H01Q 3/22 342/368 |
| 2005/0159187 A1* | 7/2005 | Mendolia | G06K 7/10346 455/562.1 |
| 2016/0072186 A1* | 3/2016 | Wang | H01Q 3/2605 342/368 |
| 2018/0131420 A1* | 5/2018 | Faxer | H04B 7/0469 |

OTHER PUBLICATIONS

Hur, Sooyoung, et al., Millimeter wave beamforming for wireless backhaul and access in small cell networks, IEEE transactions on communications 61.10 (2013): 4391-4403, https://arxiv.org/pdf/1306.6659.pdf.
Wang, Junyi, et al., Beam codebook based beamforming protocol for multi-Gbps millimeter-wave WPAN systems, GLOBECOM 2009-2009 IEEE Global Telecommunications Conference. IEEE, 2009, https://www.researchgate.net/profile/Tuncer_Baykas/publication/224595655_Beam_codebook_based_beamforming_protocol_for_multi-Gbps_millimeter-wave_WPAN_systems/links/54018eba0cf23d9765a49b4b/Beam-codebook-based-beamforming-protocol-for-multi-Gbps-millimeter-wave-WPAN-systems.pdf.
Wu, Chunlei, et al., Regional Targeting Based Millimeter-Wave Beamforming for Robot Communication in 5G Scenes, Proceedings of the 2017 International Conference on Artificial Intelligence, Automation and Control Technologies. ACM, 2017.

\* cited by examiner

*Primary Examiner* — Khanh C Tran
(74) *Attorney, Agent, or Firm* — Treyz Law Group, P.C.; Michael H. Lyons

(57) ABSTRACT

An electronic device may be provided with a phased antenna array, control circuitry, and a codebook. The control circuitry may control the phased antenna array to form a signal beam at a beam steering angle selected from a set of beam steering angles identified by the codebook. The set of beam steering angles may be evenly distributed along a two-dimensional or three-dimensional spiral path. The control circuitry may control the phased antenna array to sweep over the set of beam steering angles until external wireless equipment is found. Distributing the set of beam steering angles in this way may minimize the size of the codebook while allowing the phased antenna array to cover as much of its field of view as possible with satisfactory gain.

20 Claims, 9 Drawing Sheets

WIRELESS DEVICES HAVING SPIRALLY-DISTRIBUTED BEAM POINTING ANGLES

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications. Radio-frequency transmission line paths are coupled between the wireless transceivers and the antennas.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths but may raise significant challenges. For example, millimeter wave communications signals generated by the antennas can be characterized by substantial attenuation and/or distortion during signal propagation. Beam forming operations are often used to steer a signal beam of millimeter wave communications signals in different directions. The directions over which the signal beam can be steered are specified by a codebook. If care is not taken, the codebook can occupy excessive storage space on the electronic device.

It would therefore be desirable to be able to provide electronic devices with improved wireless communications circuitry such as communications circuitry that supports millimeter and centimeter wave communications and beam forming operations.

SUMMARY

An electronic device may be provided with wireless circuitry. The wireless circuitry may include radio-frequency transceiver circuitry and a phased antenna array. The phased antenna array may convey radio-frequency signals in a signal beam at a frequency greater than 10 GHz.

Control circuitry may control the phased antenna array to form the signal beam at a beam steering angle selected from a set of beam steering angles. The set of beam steering angles may be identified by a codebook. The set of beam steering angles may be evenly distributed along a spiral path. The spiral path may be a three-dimensional spiral path or a two-dimensional spiral path. The control circuitry may control the phased antenna array to sweep over the set of beam steering angles until external wireless equipment is found. Distributing the set of beam steering angles in this way may minimize the size of the codebook while allowing the phased antenna array to cover as much of its field of view as possible with satisfactory gain.

DETAILED DESCRIPTION

Figure 1:
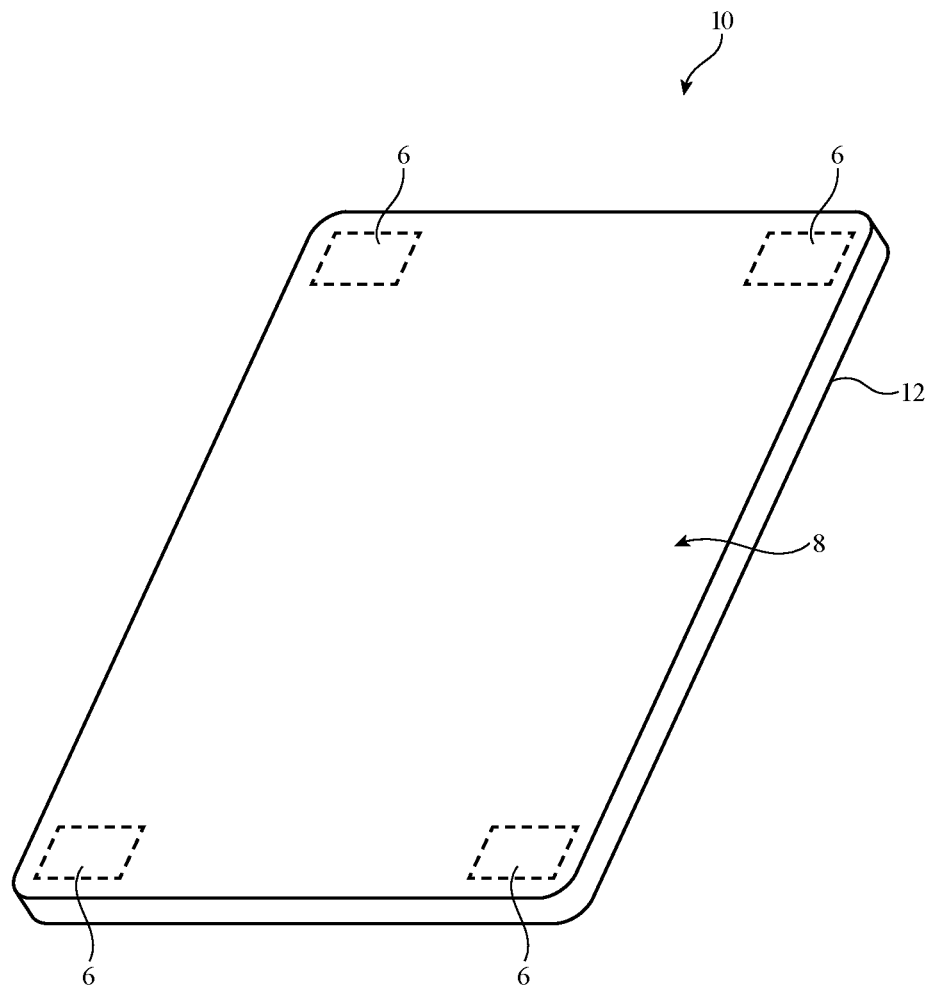
FIG. 1 is a front perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectrics. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, under a dielectric window on a rear face of housing 12 or the edge of housing 12, or elsewhere in device 10.

Figure 2:
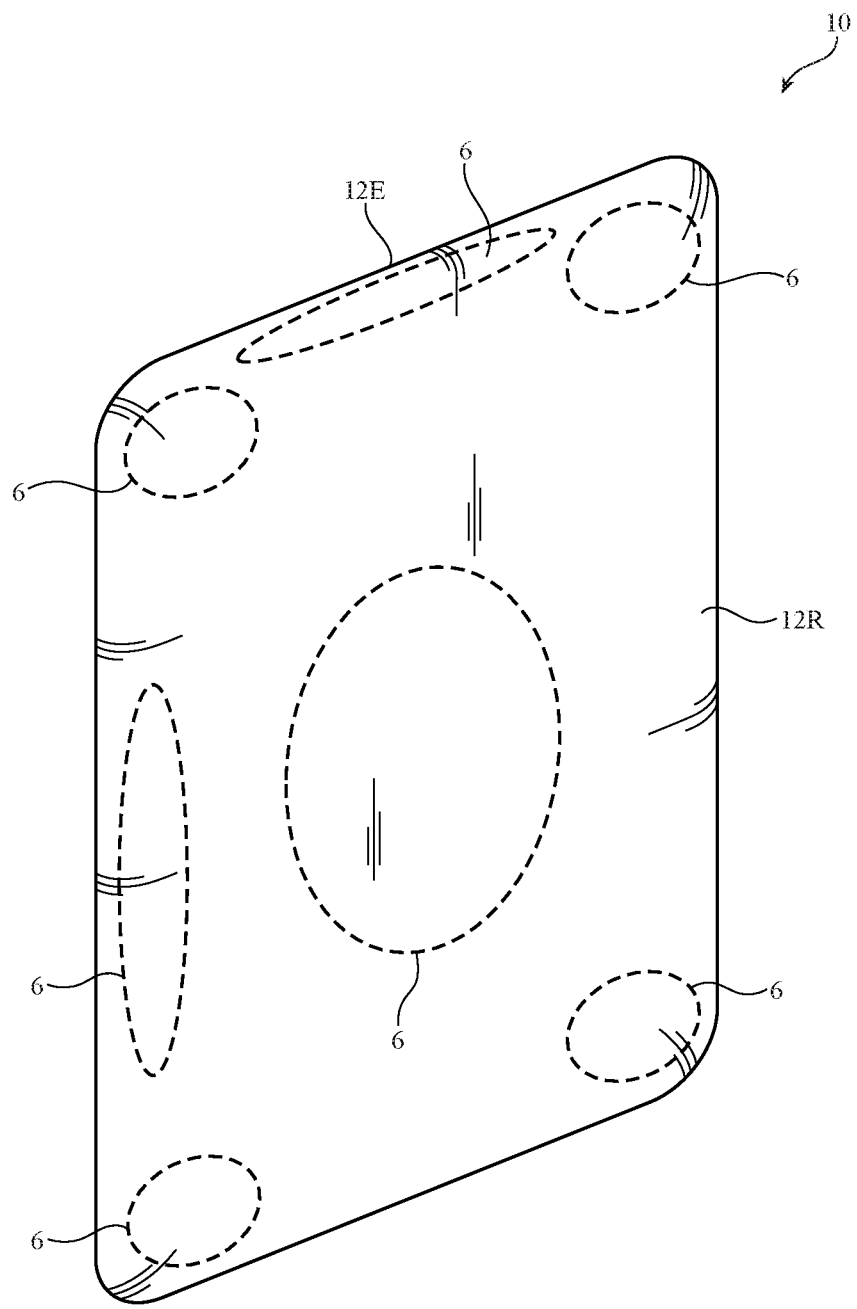
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal, regions of the housing such as slots or other openings in the metal may be filled with plastic or other dielectrics. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, etc.). Display 8 of FIG. 1 may be omitted if desired. Antennas may be located within housing 12, on housing 12, and/or external to housing 12.

Figure 3:
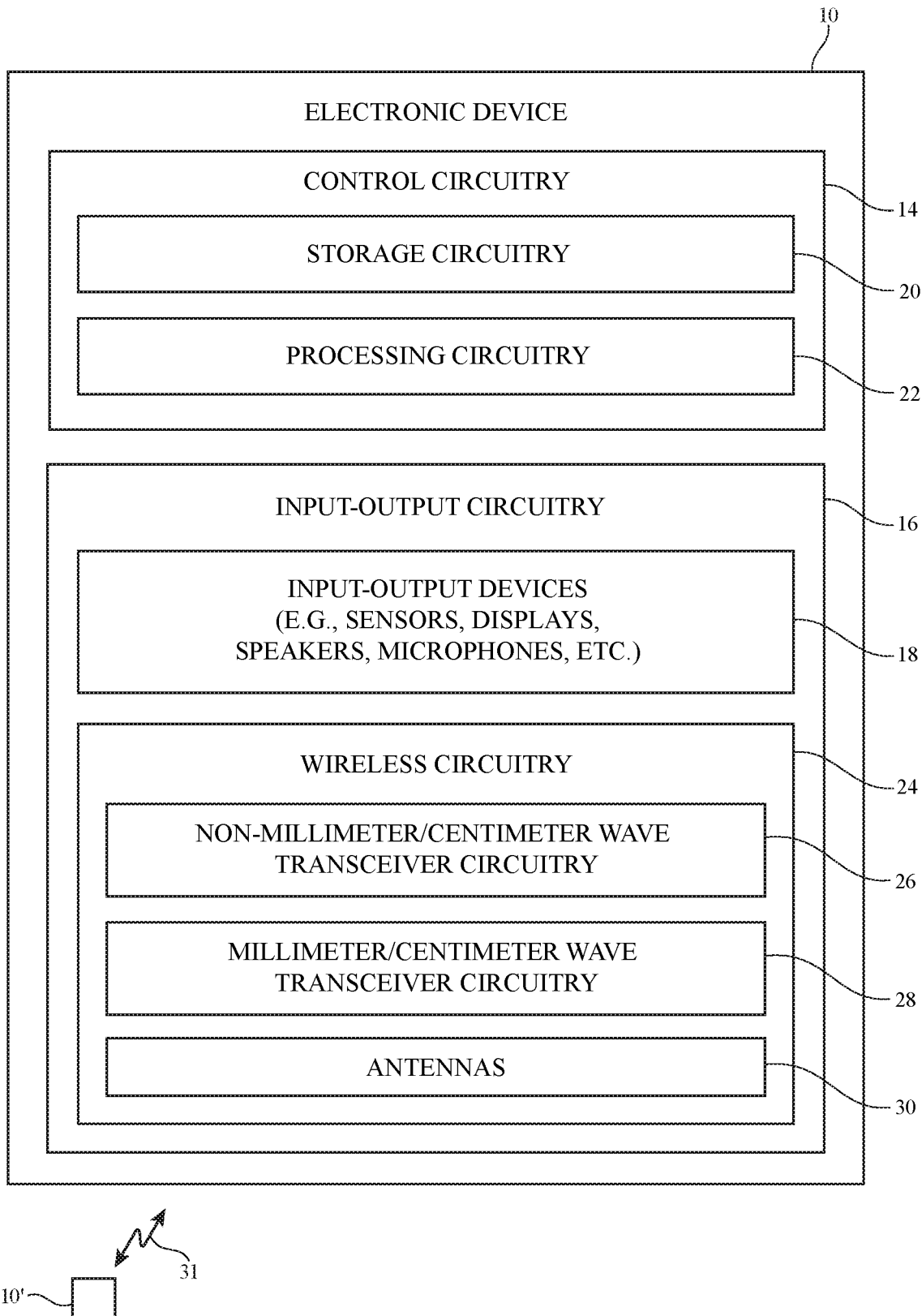
FIG. 3 is a schematic diagram of an illustrative electronic device with wireless circuitry in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc. Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols —sometimes referred to as WiFi®), protocols for other short-range wireless communications links such as the Bluetooth® protocol or other WPAN protocols, IEEE 802.1 lad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include millimeter and centimeter wave transceiver circuitry such as millimeter/centimeter wave transceiver circuitry 28. Millimeter/centimeter wave transceiver circuitry 28 may support communications at frequencies between about 10 GHz and 300 GHz. For example, millimeter/centimeter wave transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 28 may support IEEE 802.1 lad communications at 60 GHz and/or $5^{th}$ generation mobile networks or $5^{th}$ generation wireless systems (5G) communications bands between 27 GHz and 90 GHz. Millimeter/centimeter wave transceiver circuitry 28 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 28 (sometimes referred to herein simply as transceiver circuitry 28 or millimeter/centimeter wave circuitry 28) may perform spatial ranging operations using radio-frequency signals at millimeter and/or centimeter wave frequencies that are transmitted and received by millimeter/centimeter wave transceiver circuitry 28. The received signals may be a version of the transmitted signals that have been reflected off of external objects and back towards device 10. Control circuitry 14 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 14 may also process the transmitted and received signals to identify a two or three-dimensional spatial location of the external objects relative to device 10.

Spatial ranging operations performed by millimeter/centimeter wave transceiver circuitry 28 are unidirectional. If desired, millimeter/centimeter wave transceiver circuitry 28 may also perform bidirectional communications with external wireless equipment such as external wireless equipment 10' (e.g., over bi-directional millimeter/centimeter wave wireless communications link 31). External wireless equipment 10' may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 28 and the reception of wireless data that has been transmitted by external wireless equipment 10'. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may include transceiver circuitry for handling communications at frequencies below 10 GHz such as non-millimeter/centimeter wave transceiver circuitry 26. Non-millimeter/centimeter wave transceiver circuitry 26 may include wireless local area network (WLAN) transceiver circuitry that handles 2.4 GHz and 5

GHz bands for Wi-Fi® (IEEE 802.11) communications, wireless personal area network (WPAN) transceiver circuitry that handles the 2.4 GHz Bluetooth® communications band, cellular telephone transceiver circuitry that handles cellular telephone communications bands from 700 to 960 MHz, 1710 to 2170 MHz, 2300 to 2700 MHz, and/or or any other desired cellular telephone communications bands between 600 MHz and 4000 MHz, GPS receiver circuitry that receives GPS signals at 1575 MHz or signals for handling other satellite positioning data (e.g., GLONASS signals at 1609 MHz), television receiver circuitry, AM/FM radio receiver circuitry, paging system transceiver circuitry, near field communications (NFC) circuitry, etc. Non-millimeter/centimeter wave transceiver circuitry 26 and millimeter/centimeter wave transceiver circuitry 28 may each include one or more integrated circuits, power amplifier circuitry, low-noise input amplifiers, passive radio-frequency components, switching circuitry, transmission line structures, and other circuitry for handling radio-frequency signals.

Wireless circuitry 24 may include antennas 30. Non-millimeter/centimeter wave transceiver circuitry 26 may transmit and receive radio-frequency signals below 10 GHz using one or more antennas 30. Millimeter/centimeter wave transceiver circuitry 28 may transmit and receive radio-frequency signals above 10 GHz (e.g., at millimeter wave and/or centimeter wave frequencies) using antennas 30.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 28 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 26 and another type of antenna may be used in conveying radio-frequency signals at millimeter and/or centimeter wave frequencies for millimeter/centimeter wave transceiver circuitry 28. Antennas 30 that are used to convey radio-frequency signals at millimeter and centimeter wave frequencies may be arranged in one or more phased antenna arrays.

Figure 4:
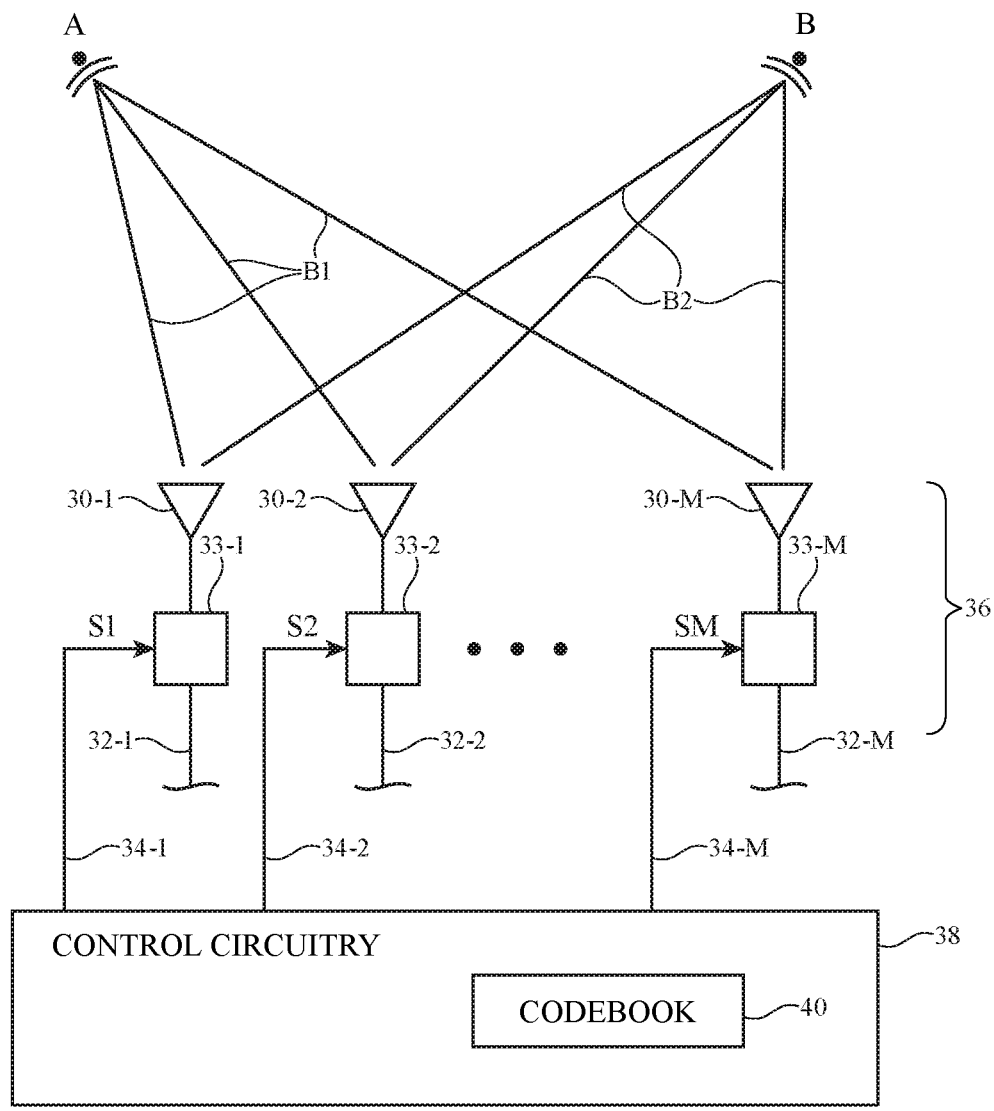
FIG. 4 is a diagram of an illustrative phased antenna array that may be controlled using a codebook to form a radio-frequency signal beam at different beam pointing angles in accordance with some embodiments.

FIG. 4 is a diagram showing how antennas 30 for handling radio-frequency signals at millimeter and centimeter wave frequencies may be formed in a phased antenna array. As shown in FIG. 4, phased antenna array 36 (sometimes referred to herein as array 36, antenna array 36, or array 36 of antennas 30) may be coupled to radio-frequency transmission lines 32. For example, a first antenna 30-1 in phased antenna array 36 may be coupled to a first radio-frequency transmission line 32-1, a second antenna 30-2 in phased antenna array 36 may be coupled to a second radio-frequency transmission line 32-2, an Mth antenna 30-M in phased antenna array 36 may be coupled to an Mth radio-frequency transmission line 32-M, etc. While antennas 30 are described herein as forming a phased antenna array, the antennas 30 in phased antenna array 36 may sometimes also be referred to as collectively forming a single phased array antenna (e.g., where each antenna 30 in the phased array antenna forms an antenna element of the phased array antenna).

Radio-frequency transmission lines 32 may each be coupled to millimeter/centimeter wave transceiver circuitry 28 of FIG. 3. Each radio-frequency transmission line 32 may include a positive signal conductor and a ground signal conductor. The positive signal conductor may be coupled to a positive antenna feed terminal on an antenna resonating element of the corresponding antenna 30. The ground signal conductor may be coupled to a ground antenna feed terminal on an antenna ground for the corresponding antenna 30.

Radio-frequency transmission lines 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, combinations of these, etc. Multiple types of transmission lines may be used to couple the millimeter/centimeter wave transceiver circuitry to phased antenna array 36. Filter circuitry, switching circuitry, impedance matching circuitry, phase shifter circuitry, amplifier circuitry, and/or other circuitry may be interposed on radio-frequency transmission line 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Antennas 30 in phased antenna array 36 may be arranged in any desired number of rows and columns or in any other desired pattern (e.g., the antennas need not be arranged in a grid pattern having rows and columns). During signal transmission operations, radio-frequency transmission lines 32 may be used to supply signals (e.g., radio-frequency signals such as millimeter wave and/or centimeter wave signals) from millimeter/centimeter wave transceiver circuitry 28

(FIG. 3) to phased antenna array 36 for wireless transmission. During signal reception operations, radio-frequency transmission lines 32 may be used to convey signals received at phased antenna array 36 (e.g., from external wireless equipment 10' of FIG. 3) to millimeter/centimeter wave transceiver circuitry 28 (FIG. 3).

The use of multiple antennas 30 in phased antenna array 36 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 4, the antennas 30 in phased antenna array 36 each have a corresponding radio-frequency phase and magnitude controller 33 (e.g., a first phase and magnitude controller 33-1 interposed on radio-frequency transmission line 32-1 may control phase and magnitude for radio-frequency signals handled by antenna 30-1, a second phase and magnitude controller 33-2 interposed on radio-frequency transmission line 32-2 may control phase and magnitude for radio-frequency signals handled by antenna 30-2, an Mth phase and magnitude controller 33-M interposed on radio-frequency transmission line 32-M may control phase and magnitude for radio-frequency signals handled by antenna 30-M, etc.).

Phase and magnitude controllers 33 may each include circuitry for adjusting the phase of the radio-frequency signals on radio-frequency transmission lines 32 (e.g., phase shifter circuits) and/or circuitry for adjusting the magnitude of the radio-frequency signals on radio-frequency transmission lines 32 (e.g., power amplifier and/or low noise amplifier circuits). Phase and magnitude controllers 33 may sometimes be referred to collectively herein as beam steering or beam forming circuitry (e.g., beam steering circuitry that steers the beam of radio-frequency signals transmitted and/or received by phased antenna array 36).

Phase and magnitude controllers 33 may adjust the relative phases and/or magnitudes of the transmitted signals that are provided to each of the antennas in phased antenna array 36 and may adjust the relative phases and/or magnitudes of the received signals that are received by phased antenna array 36. Phase and magnitude controllers 33 may, if desired, include phase detection circuitry for detecting the phases of the received signals that are received by phased antenna array 36. The term "beam," "signal beam," "radio-frequency beam," or "radio-frequency signal beam" may be used herein to collectively refer to wireless signals that are transmitted and received by phased antenna array 36 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 33 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 33 are adjusted to produce a second set of phases and/or magnitudes for the transmitted signals, the transmitted signals will form a transmit beam as shown by beam B2 that is oriented in the direction of point B. Similarly, if phase and magnitude controllers 33 are adjusted to produce the first set of phases and/or magnitudes, radio-frequency signals (e.g., radio-frequency signals in a receive beam) may be received from the direction of point A, as shown by beam B1. If phase and magnitude controllers 33 are adjusted to produce the second set of phases and/or magnitudes, radio-frequency signals may be received from the direction of point B, as shown by beam B2.

Each phase and magnitude controller 33 may be controlled to produce a desired phase and/or magnitude based on a corresponding control signal S received from control circuitry 38 of FIG. 4 over control paths 34 (e.g., the phase and/or magnitude provided by phase and magnitude controller 33-1 may be controlled using control signal S1 on control path 34-1, the phase and/or magnitude provided by phase and magnitude controller 33-2 may be controlled using control signal S2 on control path 34-2, the phase and/or magnitude provided by phase and magnitude controller 33-M may be controlled using control signal SM on control path 34-M, etc.). If desired, control circuitry 38 may actively adjust control signals S in real time to steer the transmit or receive beam in different desired directions (e.g., to different desired beam pointing angles) over time. Phase and magnitude controllers 33 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 36 and external wireless equipment (e.g., external wireless equipment 10' of FIG. 3). If the external wireless equipment is located at point A of FIG. 4, phase and magnitude controllers 33 may be adjusted to steer the signal beam towards point A (e.g., to form a signal beam having a beam pointing angle directed towards point A). Phased antenna array 36 may then transmit and receive radio-frequency signals in the direction of point A. Similarly, if the external wireless equipment is located at point B, phase and magnitude controllers 33 may be adjusted to steer the signal beam towards point B (e.g., to form a signal beam having a beam pointing angle directed towards point B). Phased antenna array 36 may then transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 36 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 38 of FIG. 4 may form a part of control circuitry 14 of FIG. 3 or may be separate from control circuitry 14 of FIG. 3. Control circuitry 38 of FIG. 4 may identify a desired beam pointing angle for the signal beam of phased antenna array 36 and may adjust the control signals S provided to phased antenna array 36 to configure phased antenna array 36 to form (steer) the signal beam at that beam pointing angle. Each possible beam pointing angle that can be used by phased antenna array 36 during wireless communications may be identified by a beam steering codebook such as codebook 40. Codebook 40 may be stored at control circuitry 38, elsewhere on device 10, or may be located (offloaded) on external equipment and conveyed to device 10 over a wired or wireless communications link.

Codebook 40 may identify each possible beam pointing angle that may be used by phased antenna array 36. Control circuitry 38 may store or identify phase and magnitude settings for phase and magnitude controllers 33 to use in implementing each of those beam pointing angles (e.g., control circuitry 38 or codebook 40 may include information that maps each beam pointing angle for phased antenna array 36 to a corresponding set of phase and magnitude values for phase and magnitude controllers 33). Codebook 40 may be hard-coded or soft-coded into control circuitry 38 or elsewhere in device 10, may include one or more databases stored at control circuitry 38 or elsewhere in device 10 (e.g., codebook 40 may be stored as software code), may include one or more look-up-tables at control circuitry 38 or elsewhere in device 10, and/or may include any other desired data structures stored in hardware and/or software on device 10. Codebook 40 may be generated during calibration of device 10 (e.g., during design, manufacturing, and/or testing of device 10 prior to device 10 being received by an end user) and/or may be dynamically updated over time (e.g., after device 10 has been used by an end user).

In general, the greater the number of possible beam pointing angles for phased antenna array 36, the larger codebook 40 needs to be to identify each of the beam pointing angles. In a hypothetical ideal scenario, phased antenna array 36 is able to form its signal beam at an infinite number of beam pointing angles (e.g., infinitesimal beam pointing angles spanning the entire hemisphere above phased antenna array 36). However, this would require a codebook of infinite size. In practice, device 10 has a finite and limited amount of storage space or other resources with which to implement codebook 40. It would therefore be desirable to be able to minimize the number of beam pointing angles identified by codebook 40 (e.g., to minimize storage and processing resource consumption within device 10) while also ensuring that a sufficient number of beam pointing angles are identified to provide as much of the hemisphere above phased antenna array 36 with satisfactory gain from the signal beam as possible (e.g., to ensure that device 10 may perform satisfactory radio-frequency communications with external wireless equipment 10' of FIG. 3 regardless of where external wireless equipment 10' is located within the hemisphere over phased antenna array 36).

Control circuitry 38 may generate control signals S based on codebook 40. For example, control circuitry 38 may identify a beam pointing angle that would be needed to communicate with external wireless equipment 10' of FIG. 3 (e.g., a beam pointing angle pointing towards external wireless equipment 10'). Control circuitry 38 may subsequently identify the beam pointing angle in codebook 40 that is closest to this identified beam pointing angle. Control circuitry 38 may use codebook 40 to generate phase and magnitude values for phase and magnitude controllers 33. Control circuitry 38 may transmit control signals S identifying these phase and magnitude values to phase and magnitude controllers 33 over control paths 34. The beam formed by phased antenna array 36 using control signals S will be oriented at the beam pointing angle identified by codebook 40. If desired, control circuitry 38 may sweep over some or all of the different beam pointing angles identified by codebook 40 until the external wireless equipment is found and may use the corresponding beam pointing angle at which the external wireless equipment was found to communicate with the external wireless equipment (e.g., over communications link 31 of FIG. 3).

Figure 5:
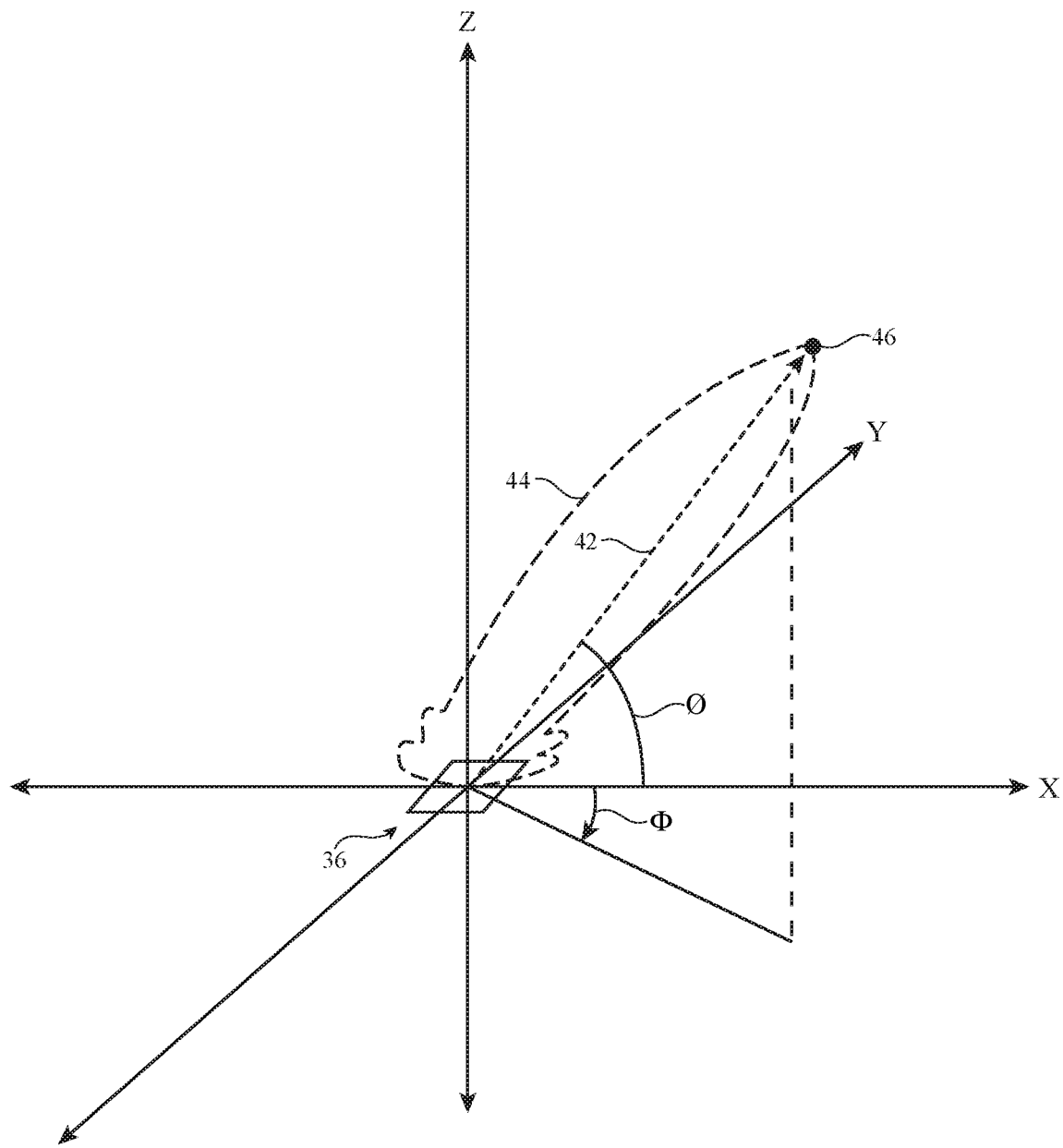
FIG. 5 is a perspective view showing how an illustrative phased antenna array may form a radio-frequency signal beam at a corresponding beam pointing angle in accordance with some embodiments.

FIG. 5 is a perspective view showing how phased antenna array 36 may generate a signal beam for performing radio-frequency communications. As shown in FIG. 5, phased antenna array 36 may produce a signal beam of radio-frequency signals such as signal beam 44 (e.g., control signals S of FIG. 4 may configure phased antenna array 36 to produce signal beam 44). Signal beam 44 may be oriented at a beam pointing angle in the direction of arrow 42 (e.g., an arrow extending from the origin to point 46). Point 46 is defined by the point of peak gain of signal beam 44 and is thus indicative of the beam pointing angle of signal beam 44. Point 46 may therefore sometimes be referred to herein as beam pointing angle 46 or beam steering angle 46. Beam pointing angle 46 may be defined in spherical coordinates using azimuthal angle $\phi$ (e.g., the angle of arrow 42 in the X-Y plane about the Z-axis and relative to the +X-axis of FIG. 5) and elevation angle $\theta$ (e.g., the angle of arrow 42 in the X-Z plane about the Y-axis and relative to the +X-axis). The length of arrow 42 (e.g., the distance from beam pointing angle 46 to the origin) gives the (peak) gain of signal beam 44. As shown in FIG. 5, signal beam 44 also exhibits a beam width about arrow 42. In general, the higher the gain of signal beam 44, the less beam width signal beam 44 will exhibit.

Figure 6:
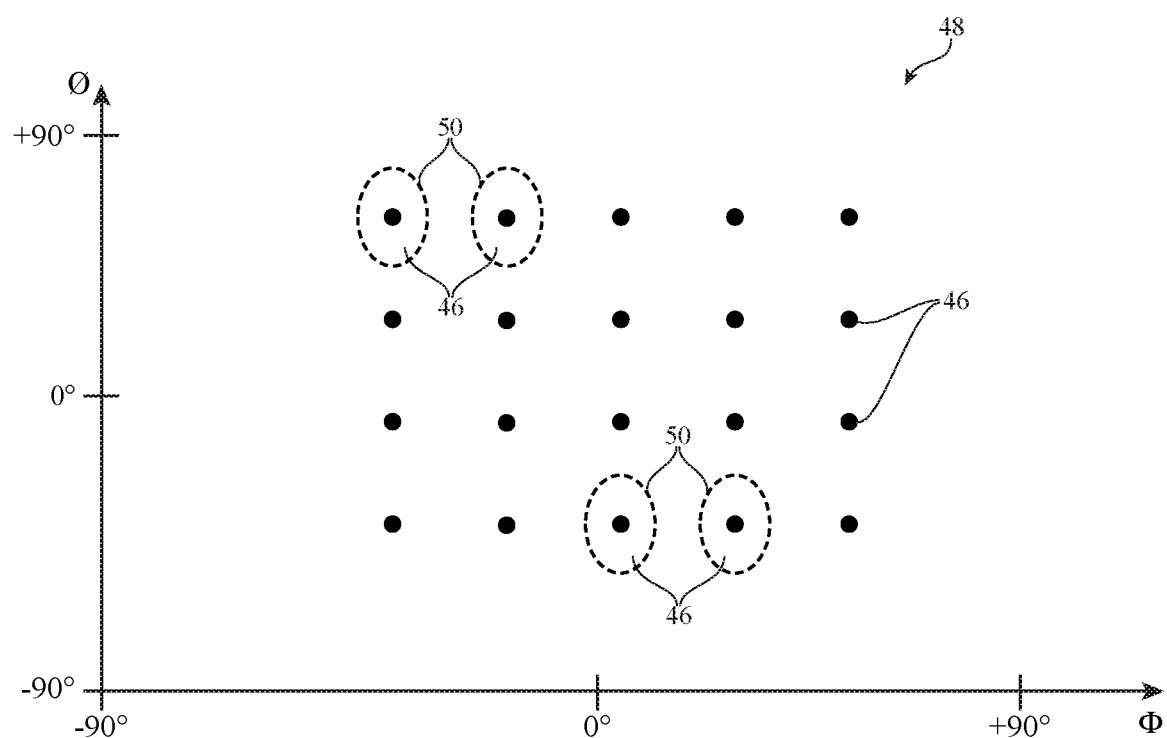
FIG. 6 is a plot of an illustrative rectangular grid of beam pointing angles that may be identified by a codebook for controlling a phased antenna array in accordance with some embodiments.

Codebook 40 of FIG. 4 may store a finite set of beam pointing angles at which signal beam 44 may be formed by phased antenna array 36 (e.g., as sets of azimuthal angles $\theta$ and corresponding elevation angles $\theta$ or using other coordinate systems). The codebook or other portions of control circuitry 38 of FIG. 4 may also store phases and magnitudes for each antenna in phased antenna array 36 (e.g., phases and magnitudes to be used in forming signal beam 44 at each beam pointing angle in the set of beam pointing angles). In some scenarios, the beam pointing angles stored at codebook 40 may lie in a grid pattern in azimuth-elevation space. FIG. 6 is a diagram of a grid pattern of beam pointing angles that may be stored at codebook 40. The horizontal axis of FIG. 6 plots azimuth angle $\phi$ whereas the vertical axis plots elevation angle $\theta$.

As shown in FIG. 6, codebook 40 may store (identify) a set 48 of beam pointing angles 46 over which phased antenna array 36 may be steered. Each beam pointing angle 46 is defined by a corresponding azimuth angle $\phi$ and elevation angle $\theta$. In the example of FIG. 6, the beam pointing angles 46 in set 48 lie in a rectangular grid pattern in azimuth-elevation space (e.g., a pattern of rows and columns). Control circuitry 38 of FIG. 4 may only control phased antenna array 36 to form signal beam 44 at one of the beam pointing angles 46 in set 48 at any given time.

The width of signal beam 44 may produce a gain above a threshold gain around each beam pointing angle 46, as shown by regions 50 (e.g., each beam pointing angle 46 has a corresponding region 50 around the point of peak gain where the signal beam exhibits a gain greater than the threshold gain). When external wireless equipment (e.g., external wireless equipment 10' of FIG. 3) is located within one of regions 50, phased antenna array 36 may perform satisfactory wireless communications with the external wireless equipment. If the external wireless equipment lies outside of any regions 50, phased antenna array 36 may be unable to point the signal beam towards the external wireless equipment such that the gain of the signal beam at the external wireless equipment is sufficient for satisfactory signal quality to be obtained. Regions 50 are only shown for some beam pointing angles 46 in FIG. 6 for the sake of clarity and, in general, each beam pointing angle 46 has a corresponding region 50. The example of FIG. 6 is merely illustrative. Regions 50 may have other shapes. In other arrangements, beam pointing angles 46 may be arranged in a hexagonal grid pattern or in any other desired grid patterns.

When codebook 40 identifies a set of beam pointing angles lying on a regular grid pattern such as set 48 of FIG. 6, the grid pattern may exhibit areas within the field of view of phased antenna array 36 that are not covered by any regions 50. There may also be excessive overlap between regions 50, such that more beam pointing angles are stored than necessary to ensure that the entire field of view of phased antenna array 36 lies within a region 50. In order to minimize the number of beam pointing angles for phased antenna array 36 (e.g., to minimize the number of beam pointing angles 46 in set 48 stored at codebook 40) while still ensuring that the entire field of view of phased antenna array 36 lies within a region 50, the beam pointing angles 46 in set 48 may be distributed along a spiral path in azimuth-elevation space.

Figure 7:
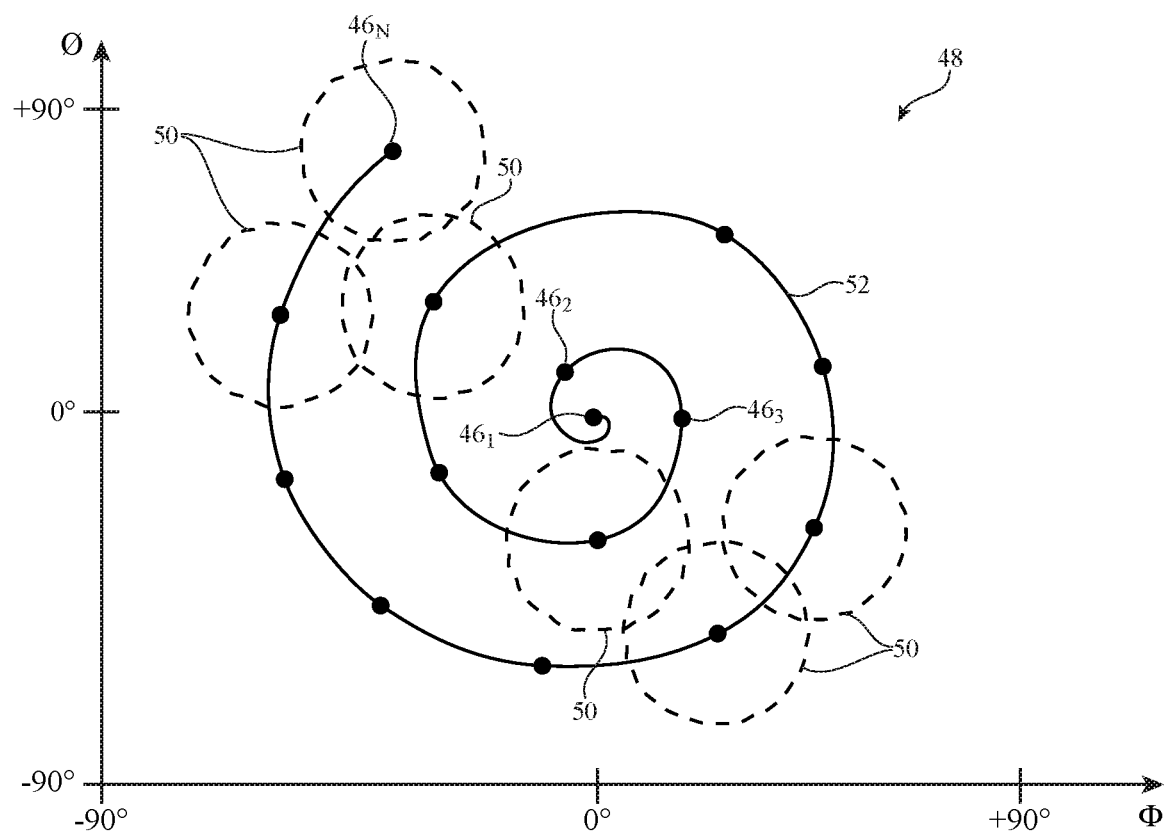
FIG. 7 is a plot of an illustrative pattern of beam pointing angles lying along a spiral path that may be identified by a codebook for controlling a phased antenna array in accordance with some embodiments.

FIG. 7 is a diagram showing how codebook 40 may store beam pointing angles that are distributed along a spiral path. As shown in FIG. 7, the beam pointing angles 46 in set 48 lie along a spiral path such as spiral path 52 in azimuth-elevation space. Codebook 40 may identify N beam pointing angles over which phased antenna array 36 may form signal beam 44 of FIG. 5 (e.g., there may be N beam pointing angles 46 in set 48). Beam pointing angles 46 may be distributed along spiral path 52 from a first beam pointing angle $46_1$ (e.g., at the center of spiral path 52) to an Nth beam pointing angle $46_N$ (e.g., at the end of spiral path 52).

Spiral path 52 may have any desired spiral shape and beam pointing angles 46 may be distributed using any desired distribution pattern along spiral path 52. In one suitable arrangement, each beam pointing angle 46 may be spaced at equal distances along spiral path 52 from the immediately preceding and immediately succeeding beam pointing angles 46 on spiral path 52 (e.g., beam pointing angles 46 may be uniformly distributed along spiral path 52). For example, the length of spiral path 52 extending from beam pointing angle $46_1$ to beam pointing angle $46_2$ may be equal to the length of spiral path 52 extending from beam pointing angle $46_2$ to beam pointing angle $46_3$ and the length of spiral path 52 extending from point $46_N$ to the immediately preceding beam pointing angle 46 in set 48, etc. When arranged in this way, beam pointing angles 46 may be arranged in a (spiral) phyllotaxis distribution in azimuth-elevation space (e.g., where beam pointing angles 46 form the leaves and spiral path 52 forms the stem of the phyllotaxis distribution).

By arranging the possible beam pointing angles for phased antenna array 36 in this way, regions 50 around beam pointing angles 46 may collectively cover all or as much of the field of view of phased antenna array 36 as possible, while also minimizing overlap between regions 50. This may serve to minimize the number of beam pointing angles 46 in set 48 and thus the amount of space on device 10 required to implement codebook 40 for providing coverage across the field of view of the phased antenna array with satisfactory gain.

Figure 8:
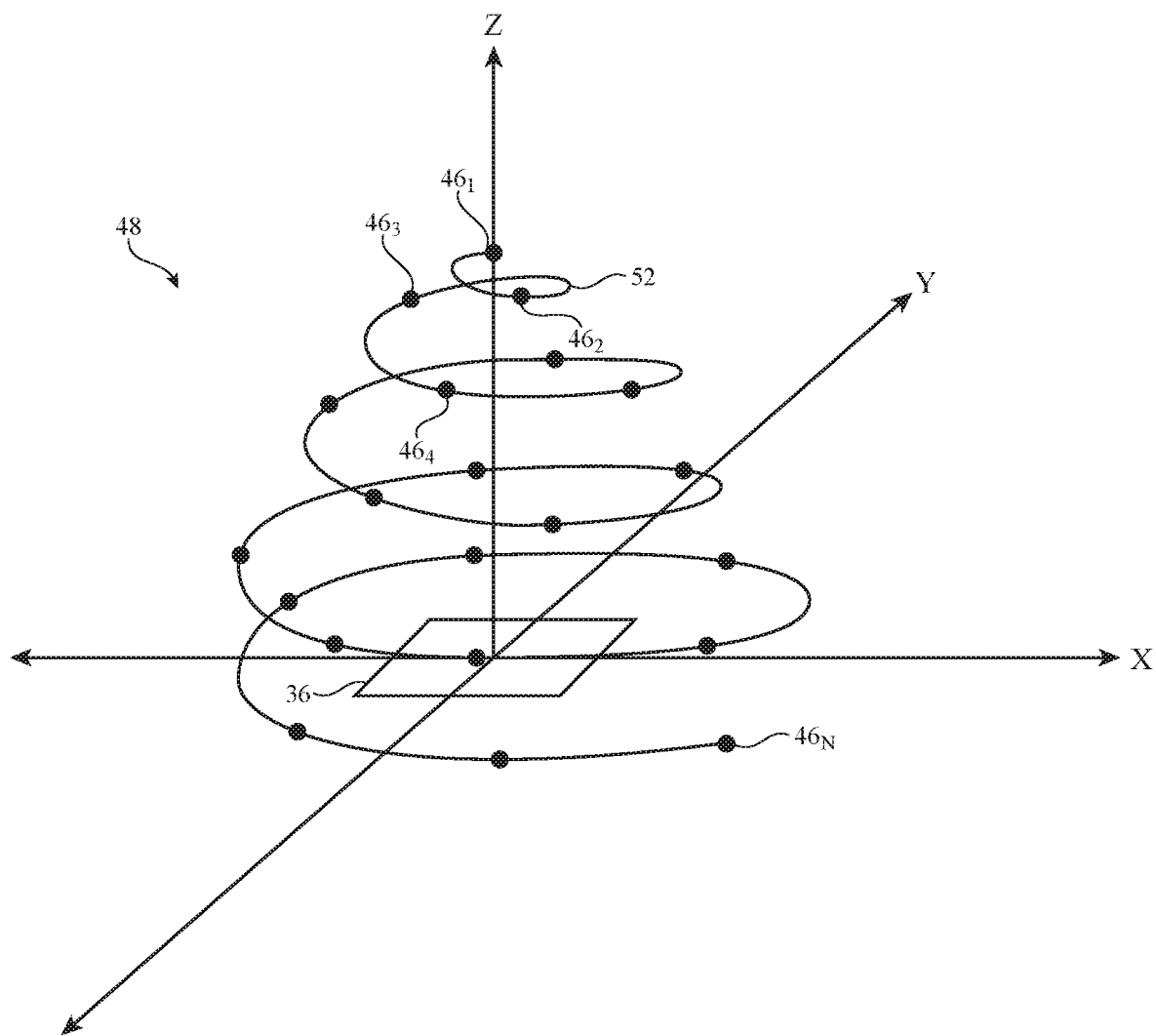
FIG. 8 is a perspective view showing how an illustrative phased antenna array may form a radio-frequency signal beam at different beam pointing angles lying along a three-dimensional spiral path in accordance with some embodiments.

The spiral distribution of beam pointing angles 46 in the azimuth-elevation space of FIG. 7 may produce beam pointing angles along a three-dimensional spiral path in cartesian X-Y-Z space, as shown in FIG. 8. As shown in FIG. 8, spiral path 52 is a three-dimensional spiral (e.g., a spherical spiral lying along the surface/perimeter of a sphere in X-Y-Z space). Beam pointing angles 46 in set 48 lie along spiral path 52 in three-dimensional space (e.g., along the surface/perimeter of a sphere). Phased antenna array 36 may form its signal beam (e.g., signal beam 44 of FIG. 5) at one of the beam pointing angles 46 in set 48 (e.g., where the signal beam exhibits peak gain at that beam pointing angle 46).

In this way, phased antenna array 36 may be able to form the signal beams at angles that allow for the entire field of view of phased antenna array 36 to be provided with satisfactory gain while also minimizing the number of beam pointing angles stored at codebook 40 (e.g., while minimizing the number of signal beams formable by the phased antenna array). The example of FIG. 8 is merely illustrative. Spiral path 52 may lie along any desired shapes in three-dimensional space. The field of view of phased antenna array 36 may span any desired angles. Spiral path 52 may be confined to a single plane in X-Y-Z space if desired (e.g., spiral path 52 may lie within a single X-Y plane).

The distribution of beam pointing angles 46 on spiral path 52 may be such that there is a constant density of beam pointing angles 46 as the surface area of the sphere in X-Y-Z space on which spiral path 52 is located increases (or, in scenarios where spiral path 52 is confined to a single plane in X-Y-Z space, as the area of the disk in which spiral path 52 lies increases). Consider a simplified example in which spiral path 52 is confined to a single plane in X-Y-Z space. In this scenario, the radius $r_i$ of the $i^{th}$ beam pointing angle 46 along spiral path 52 (e.g., the distance from the origin to the $i^{th}$ beam pointing angle 46 in set 48) is given by the formula $r_i$=SQRT(i/N), where "SQRT( )" is the square-root operator, "/" is the division operator, and N is the total number of beam pointing angles 46 in set 48. The azimuthal angle $\phi_i$ of the $i^{th}$ beam pointing angle 46 within the plane (e.g. about the Z-axis) is given by the formula $\phi_i$=i*γ, where "*" is the multiplication operator and γ is the golden angle. Golden angle γ is given by the formula γ=2π*(1−φ$^{-1}$), where φ is the golden ratio (e.g., [1+SQRT(5)]/2). While this example gives the distribution of beam pointing angles 46 along a spiral path in two dimensions for the sake of illustration, this may be generalized into spherical coordinates to obtain the distribution of beam pointing angles 46 along a three-dimensional spiral path 52 (e.g., as shown by FIGS. 7 and 8).

Codebook 40 (FIG. 4) may store the set 48 of beam pointing angles 46 distributed along spiral path 52 (FIGS. 7 and 8). Control circuitry 38 or codebook 40 (FIG. 4) may store the phase and magnitude settings used by phased antenna array 36 to form the signal beams corresponding to beam pointing angles 46 (e.g., signal beam 44 of FIG. 5). Control circuitry 38 may generate control signals S (FIG. 4) based on codebook 40 to form signal beam 44 at one of the beam pointing angles 46 in set 48. Once signal beam 44 is formed, phased antenna array 36 may convey radio-frequency signals with external wireless equipment overlapping the region 50 (FIG. 7) of the signal beam (e.g., external wireless equipment 10' of FIG. 3). If desired, control circuitry 38 of FIG. 4 may sweep (cycle) through multiple beam pointing angles 46 in set 48 until wireless equipment 10' is found (e.g., in scenarios where device 10 lacks a priori knowledge of the location of external wireless equipment 10').

Figure 9:
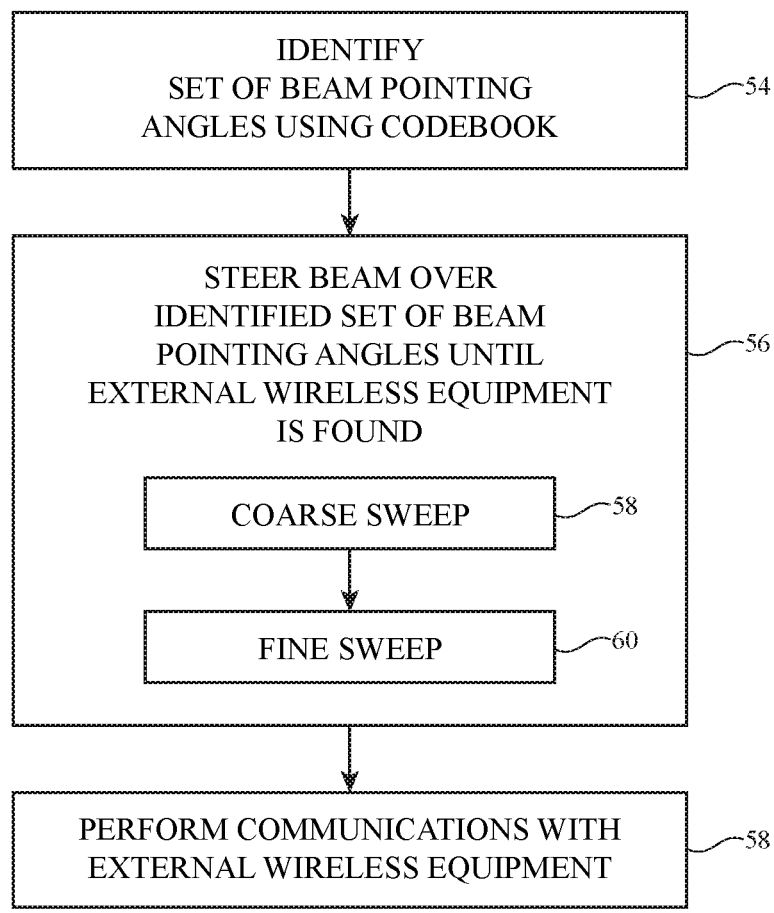
FIG. 9 is a flow chart of illustrative steps that may be performed by an electronic device in forming a radio-frequency signal beam at different beam pointing angles of the type shown in FIGS. 7 and 8 in accordance with some embodiments.

FIG. 9 is a flow chart of illustrative steps that may be performed by device 10 in using the beam pointing angles 46 stored at codebook 40 to sweep through different signal beams until the external wireless equipment is found. The steps of FIG. 9 may, for example, be performed by control circuitry 38 (e.g., by executing software code or other instructions stored at storage circuitry on or coupled to device 10).

At step 54, control circuitry 38 (FIG. 4) may use codebook 40 to identify a set of beam pointing angles to sweep through. For example, control circuitry 38 may identify the set 48 of beam pointing angles 46 lying along spiral path 52 of FIGS. 7 and 8. Beam pointing angles 46 may be generated during calibration of device 10 (e.g., during manufacture or testing of device 10) or may be generated during operation of device 10 by an end user.

At step 56, control circuitry 38 may steer (sweep) the signal beam of phased antenna array 36 over some or all of the beam pointing angles 46 in the identified set 48 until the external wireless equipment is found. For example, control circuitry 38 may control phased antenna array 36 to form signal beam 44 (FIG. 5) at the beam pointing angle associated with beam pointing angle $46_1$ of FIG. 7. Control circuitry 38 may process radio-frequency signals transmitted and/or received by phased antenna array 36 at this beam pointing angle to determine whether the external wireless equipment is present at that beam pointing angle. Control circuitry 38 may determine that the external wireless equipment is present if radio-frequency signals are received from the external wireless equipment with a signal quality greater than a threshold signal quality, if an acknowledgment message is received from the external wireless equipment, or using any other desired processes. If the external wireless equipment is not located at the beam pointing angle, control circuitry 38 may control phased antenna array 36 to form signal beam 44 at the beam pointing angle associated with beam pointing angle $46_2$ of FIG. 7. Control circuitry 38 may then process radio-frequency signals transmitted and/or received by phased antenna array 36 at this beam pointing angle to determine whether the external wireless equipment is present at that beam pointing angle. This process may be repeated for different beam pointing angles 46 in set 48 until the external wireless equipment is found. This example is merely illustrative. Control circuitry 38 may sweep through any subset of some or all of the beam pointing angles 46 in set 48 and may sweep through beam pointing angles 46 in any desired order.

If desired, control circuitry 38 may perform a coarse sweep over some of the beam pointing angles 46 in set 48 (step 58). Once the control circuitry identifies that the external wireless equipment is present at one of the beam pointing angles in the coarse sweep, control circuitry 38 may perform a fine sweep over the beam pointing angles 46 in set 48 around that beam pointing angle (step 60). In another suitable arrangement, control circuitry 38 may use a different set of beam pointing angles for performing the coarse sweep and then use the set 48 of beam pointing angles 46 lying on spiral path 52 to perform the fine sweep. In yet another suitable arrangement, control circuitry 38 may use the set 48 of beam pointing angles 46 lying on spiral path 52 to perform the coarse sweep and may then use a different set of beam pointing angles for performing the fine sweep.

At step 58, once the external wireless equipment has been found, phased antenna array 36 may perform radio-frequency communications with the external wireless equipment using the beam pointing angle at which the external wireless equipment was found (e.g., over communications link 31 of FIG. 3). When the external wireless equipment or device 10 moves, when the wireless link is dropped, or when another trigger event occurs, the steps of FIG. 9 may be repeated to find the external wireless equipment for performing wireless communications. By using signal beams at beam pointing angles corresponding to evenly-distributed points along spiral path 52 of FIGS. 7 and 8, the size of codebook 40 (FIG. 4) may be minimized while still allowing device 10 to communicate with the external wireless equipment regardless of where the external wireless equipment is located within the field of view of phased antenna array 36.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a phased antenna array configured to convey radio-frequency signals at a frequency greater than 10 GHz; and
control circuitry coupled to the phased antenna array, wherein the control circuitry is configured to control the phased antenna array to form a signal beam of the radio-frequency signals at a beam pointing angle selected from a set of beam pointing angles identified by a codebook, the beam pointing angles in the set of beam pointing angles are distributed along a spiral path, the control circuitry is configured to identify phase and magnitude settings for the phased antenna array based on the beam pointing angle selected from the set of beam pointing angles, and the phased antenna array is configured to form the signal beam using the phase and magnitude settings identified by the control circuitry.

2. The electronic device defined in claim 1, wherein the beam pointing angles in the set of beam pointing angles are uniformly distributed along the spiral path.

3. The electronic device defined in claim 2, wherein the spiral path is a three-dimensional spiral path.

4. The electronic device defined in claim 3, wherein the three-dimensional spiral path lies on a surface of a sphere.

5. The electronic device defined in claim 1, wherein the spiral path is a two-dimensional spiral path.

6. The electronic device defined in claim 1, wherein the codebook is hard-coded on the electronic device.

7. An electronic device comprising:
a phased antenna array configured to convey radio-frequency signals at a frequency greater than 10 GHz; and
control circuitry coupled to the phased antenna array, wherein the control circuitry is configured to control the phased antenna array to form a signal beam of the radio-frequency signals at a beam pointing angle selected from a set of beam pointing angles identified by a codebook, the beam pointing angles in the set of beam pointing angles are distributed along a spiral path, and the beam pointing angles in the set of beam pointing angles are arranged in a phyllotaxis distribution along the spiral path.

8. An electronic device comprising:
a phased antenna array configured to convey radio-frequency signals at a frequency greater than 10 GHz; and
control circuitry coupled to the phased antenna array, wherein the control circuitry is configured to control the phased antenna array to form a signal beam of the radio-frequency signals at a beam pointing angle selected from a set of beam pointing angles identified by a codebook, the beam pointing angles in the set of beam pointing angles are distributed along a spiral path, and the control circuitry is configured to control the phased antenna array to sweep through the beam pointing angles in the set of beam pointing angles until the signal beam overlaps external wireless equipment.

9. The electronic device defined in claim 8, wherein the beam pointing angles in the set of beam pointing angles are uniformly distributed along the spiral path.

10. The electronic device defined in claim 8, wherein the spiral path is a three-dimensional spiral path that lies on a surface of a sphere.

11. The electronic device defined in claim 10, wherein the beam pointing angles in the set of beam pointing angles are uniformly distributed along the spiral path.

12. The electronic device defined in claim 8, wherein the spiral path is a two-dimensional spiral path.

13. The electronic device defined in claim 8, wherein the codebook is hard-coded on the electronic device.

14. Apparatus comprising:
   a phased antenna array configured to convey radio-frequency signals using a signal beam;
   a codebook that identifies a set of beam steering angles for the signal beam, wherein the beam steering angles in the set of beam steering angles are evenly-distributed along a spiral path; and
   control circuitry configured to control the phased antenna array to steer the signal beam over the set of beam steering angles identified by the codebook, wherein the spiral path is a three-dimensional spiral path that lies on a spherical surface.

15. The apparatus defined in claim 14, wherein the control circuitry is configured to control the phased antenna array to sequentially form the signal beam at different beam steering angles in the set of beam steering angles until the signal beam overlaps external wireless equipment.

16. The apparatus defined in claim 15, wherein the control circuitry is configured to control the phased antenna array to perform a coarse sweep over at least some of the set of beam steering angles identified by the codebook and to perform a fine sweep over at least some of the set of beam steering angles identified by the codebook.

17. The apparatus defined in claim 15, wherein the control circuitry is configured to control the phased antenna array to perform a coarse sweep over an additional set of beam steering angles identified by the codebook and to perform a fine sweep over the set of beam steering angles identified by the codebook.

18. The apparatus defined in claim 17, wherein the control circuitry is configured to control the phased antenna array to perform a coarse sweep over the set of beam steering angles identified by the codebook and to perform a fine sweep over an additional set of beam steering angles identified by the codebook.

19. The apparatus defined in claim 14, wherein the codebook is hard-coded at the control circuitry.

20. The apparatus defined in claim 14 wherein the apparatus is an electronic device having a touch screen display.

* * * * *